United States Patent
Cho

(10) Patent No.: US 7,561,869 B2
(45) Date of Patent: Jul. 14, 2009

(54) PUSH TO TALK (PTT) SERVICE MOBILE COMMUNICATION SYSTEM AND METHOD

(75) Inventor: Byeong-Hwa Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 667 days.

(21) Appl. No.: 11/231,897

(22) Filed: Sep. 22, 2005

(65) Prior Publication Data

US 2006/0063513 A1    Mar. 23, 2006

(30) Foreign Application Priority Data

Sep. 23, 2004    (KR) ...................... 10-2004-0076628

(51) Int. Cl.
*H04W 4/10*    (2009.01)
*H04W 4/12*    (2009.01)

(52) U.S. Cl. ...................... 455/413; 455/520

(58) Field of Classification Search ...................... None
See application file for complete search history.

(56) References Cited

U.S. PATENT DOCUMENTS

| 6,426,956 | B1 | 7/2002 | Eteminan |
| 2004/0047303 | A1* | 3/2004 | Fernandez et al. .......... 370/293 |

* cited by examiner

*Primary Examiner*—Philip J Sobutka
(74) *Attorney, Agent, or Firm*—Birch, Stewart, Kolasch & Birch, LLP

(57) ABSTRACT

A mobile communication system includes a sender terminal configured to input PTT (Push to Talk) voice data, a PTT server configured to convert the PTT voice data into VMS (Voice Mail System) formatted voice data, and a VMS server configured to receive the VMS formatted voice data from the PTT server and to transmit the VMS formatted voice data to receiver terminals.

16 Claims, 4 Drawing Sheets

PUSH TO TALK (PTT) SERVICE MOBILE COMMUNICATION SYSTEM AND METHOD

CROSS REFERENCE TO A RELATED APPLICATION

This application is related to Korean Patent Application No. 10-2004-0076628, filed on Sep. 23, 2004, the entire contents of which is incorporated by reference in its entirety.

BACKGROUND OF THE INVENTION

1. Field of the Invention

The present invention relates to a mobile communication system and method, and more particularly to a Push To Talk (hereinafter, referred to as 'PTT') service mobile communication system and method that allows PTT terminals to communicate with non-PTT terminals and vice-versa.

2. Description of the Background Art

The PTT service allows a user to set his or her terminal to be used as a walkie-talkie. Further, the PTT service supports a one to N communication service allowing a user to communicate with a small or medium-sized group. For example, FIG. 1 is an overview illustrating a general PTT service mobile communication system. As shown, the PTT service mobile communication system includes PTT terminals 10 and 30 and a PTT server 20.

Further, to use the PTT service, the user first selects the PTT function on the PTT terminal 10, and then enters the identification numbers or telephone numbers (hereinafter, referred to as telephone numbers) of the PTT terminals 30 and then begins speaking into the terminal 10.

The inputted voice (PTT voice data) and telephone numbers are then transmitted to the PTT server 20, which confirms whether the received numbers are registered (e.g., stored in a memory of the PTT server 20) Then, if the telephone numbers are properly registered, the PTT server 20 transmits the PTT voice data to the appropriate PTT terminals 30 corresponding to the dialed telephone numbers. Further, the PTT voice data transmitted to each PTT terminal 30 is outputted through a speaker on a respective terminal 30.

However, the background art PTT service can only be used with terminals that support the PTT function and that are subscribed to the PTT service. That is, terminals which do not support the PTT function cannot use the PTT service. Thus, a user using a terminal that does not include the PTT function cannot communicate with terminals 30 via the PTT mode (i.e., walkie-talkie mode) and must communicate with the PTT terminals via short text messages or via a traditional voice call.

SUMMARY OF THE INVENTION

Accordingly, one object of the present invention is to solve the above-noted and other problems.

Another, an object of the present invention is to provide a system and method that allows PTT terminals to communicate with non-PTT terminals and vice-versa.

To achieve these and other advantages and in accordance with the purpose of the present invention, as embodied and broadly described herein, the present invention provides a novel PTT service mobile communication system including a sender terminal configured to input PTT voice data, a PTT server configured to receive the PTT voice data and to convert the PTT voice data into VMS (Voice Mail System) voice data, and a VMS server configured to receive the converted VMS voice data from the PTT server and to transmit the converted VMS voice data to a receiver terminal. The present invention also includes a corresponding PTT method.

Further, the PTT server preferably includes a first module configured to convert the PTT voice data into the VMS formatted voice data, a second module configured to transmit the VMS formatted voice data to the VMS server, and a third module configured to compare first numbers input at the sender terminal that correspond to the receiving terminals with second numbers of PTT receiver terminals existing in a PTT service area.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
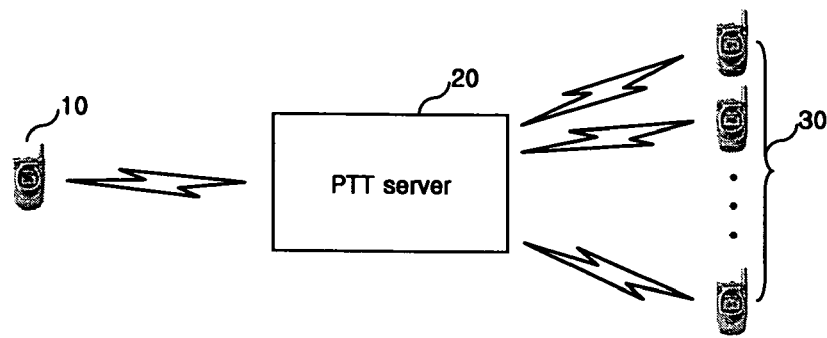
FIG. 1 is an overview illustrating a background art PTT service mobile communication system.
Figure 2:
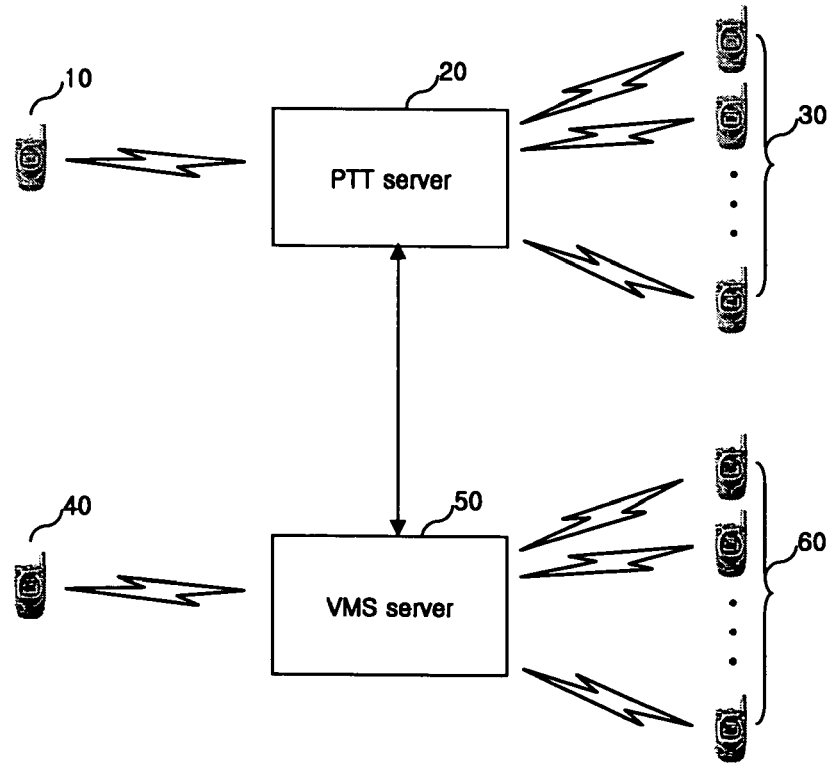
FIG. 2 is an overview illustrating a PTT service mobile communication system according to the present invention.

The present invention allows PTT terminals to communicate with non-PTT terminals and vice-versa by interworking a PTT server and a Voice Mail System (VMS) server. In more detail, FIG. 2 is an overview illustrating a PTT service system according to the present invention. As shown, the PTT service system includes PTT terminals 10 and 30, a PTT server 20, non-PTT terminals 40 and 60, and a VMS server 50.

Further, the PTT server 20 includes, for example, a module for converting PTT voice data from the PTT terminal 10 into VMS formatted voice data, a module for transmitting the VMS formatted voice data to the VMS server 50, and a module for transmitting PTT formatted voice data received from the VMS server 50 to the PTT terminals 30. In addition, the VMS server 50 includes, for example, a module for converting voice data sent from the non-PTT terminal 40 into PTT formatted voice data, a module for transmitting the converted PTT formatted voice data to the PTT server 20, a storage device for storing VMS formatted voice data received from the PTT server 20, and a module for transmitting the stored VMS formatted voice data to the non-PTT terminals 60.

In addition, each of the non-PTT terminals 40 and 60 includes a module for reproducing the VMS formatted voice data produced by the PTT server 20, a module for informing a user of the terminal that VMS formatted voice data produced by the PTT server 20 has been received, and a module for transmitting VMS formatted voice data to at least one other terminal.

The PTT service mobile communication system according to the first embodiment of the present invention will now be described in detail with reference to FIG. 2. The first embodiment is directed to the PTT terminal 10 communicating with the non-PTT terminals 60 as well as the PTT terminals 30.

In more detail, when a user of the PTT terminal 10 wants to communicate (transmit PTT voice data) to the PTT terminals 30 and non-PTT terminals 60, the user inputs or selects the respective telephone numbers of the terminals 30 and 60 and speaks into the terminal 10. Then, the PTT terminal 10 transmits the inputted telephone numbers and PTT voice data to the PTT server 20. For input telephone numbers that are stored and registered in the PTT server 20 (e.g., for terminals that are PTT terminals), the PTT server 20 transmits the PTT voice data directly to the corresponding PTT terminals 30. The PTT terminals 30 then reproduce the PTT voice data.

In addition, for input numbers that are not stored or registered in the PTT server 20 (e.g., for terminals that are non-PTT terminals), the PTT server 20 converts the PTT voice data into VMS formatted voice data, and transmits the VMS formatted voice data along with the appropriate telephone numbers to the VMS server 50 that serves the corresponding non-PTT terminals 60. The VMS server 50 then compares the transmitted telephone numbers with stored numbers corresponding to the terminals 60, and transmits the VMS formatted voice data converted by the PTT server 20 to the corresponding terminals 60. The terminals 60 then reproduce the VMS formatted voice data.

Thus, when the PTT server 20 confirms that the telephone numbers input at the PTT terminal 10 are identical to previously-stored and registered PTT terminal numbers, the PTT server 20 directly transmits (e.g., without converting) the PTT voice data to the corresponding PTT terminals 30. However, if the telephone numbers are not identical, the PTT server 20 converts the PTT voice data from the terminal 10 into VMS formatted voice data, and transmits the VMS formatted voice data and telephone numbers to the VMS server 50. The VMS server 50 then transmits the VMS formatted voice data to the appropriate non-PTT terminals 60, which reproduce the VMS formatted voice data in a speaker, for example.

The PTT service mobile communication system according to the second embodiment of the present invention will now be described in detail with reference to FIG. 2. The second embodiment is directed to the non-PTT terminal 40 communicating with the PTT terminals 30 as well as the non-PTT terminals 60.

When a user of the non-PTT terminal 40 wants to communicate with people using the PTT terminals 30 and the non-PTT terminals 60, the user accesses the VMS server 50, inputs the appropriate telephone numbers corresponding to the PTT terminals 30 and non-PTT terminals 60, and then begins talking into the terminal 40. The non-PTT terminal 40 then transmits the inputted telephone numbers and the voice data to the VMS server 50. Further, the VMS server 50 converts the VMS voice data into PTT formatted voice data, and transmits the inputted telephone numbers and the PTT formatted voice data to the PTT server 20.

The PTT server 20 then confirms if the received telephone numbers match previously stored telephone numbers corresponding to the PTT terminals 30. If the numbers match, the PTT server 20 transmits the PTT formatted voice data to the PTT terminals 30. However, when the numbers do not match (namely, when the inputted telephone numbers correspond to VMS or non-PTT terminals), the PTT server 20 converts the PTT formatted voice data into VMS formatted voice data, and transmits the VMS formatted voice data to the VMS server 50 serving the corresponding non-PTT terminals 60. The VMS server 50 then stores the VMS formatted voice data transmitted from the PTT server 20, and transmits the VMS formatted voice data to the appropriate non-PTT terminals 60.

Thus, the VMS server 50 transmits the inputted telephone numbers and the PTT formatted voice data (obtained by converting the VMS voice data into the PTT voice data) to the PTT server 20. The PTT server 20 compares the telephone numbers transmitted from the VMS server 50 with stored telephone numbers, for example, to determine if the numbers correspond to PTT terminals or non-PTT terminals. When the telephone numbers correspond to the non-PTT terminals 60, the PTT server 20 converts the PTT formatted voice data into VMS formatted voice data, and transmits the VMS formatted voice data to the VMS server 50. The VMS server 50 then stores the received VMS formatted voice data, and transmits the VMS formatted voice data to the non-PTT terminals 60 corresponding to the input telephone numbers. When the telephone numbers correspond to PTT terminals, the PTT server 20 transmits the PTT formatted voice data converted by the VMS server 50 to the appropriate PTT terminals 30.

Figure 3:
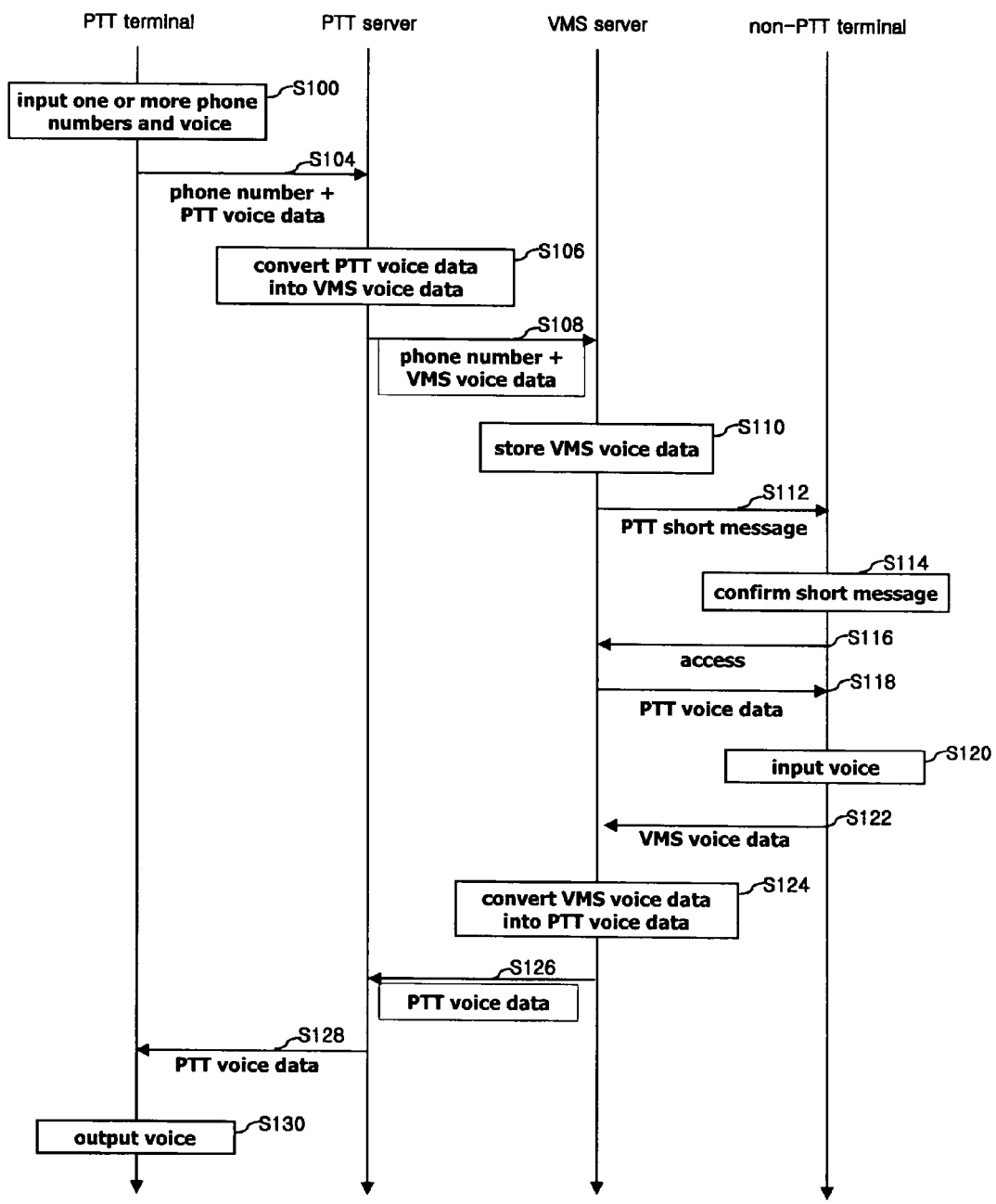
FIG. 3 is a flowchart illustrating a PTT service mobile communication method according to a first embodiment of the present invention.

Turning next to FIG. 3, which is a flowchart illustrating the PTT service mobile communication method according to the first embodiment of the present invention. The components in FIG. 2 are also used in the below description. As described above, the first embodiment is directed to allowing the PTT terminal 10 to transmit PTT voice data to the PTT terminals 30 as well as to the non-PTT terminals 60.

When a user of the PTT terminal 10 wants to speak with users using PTT terminals and non-PTT terminals, the user first selects the PTT function on the terminal 10, inputs or selects the appropriate telephone numbers of terminals that he or she wants to call, and begins speaking into the terminal (S100). The inputted terminal telephone numbers and the PTT voice data are then transmitted to the PTT server 20 (S104). Next, the PTT server 20 determines whether or not the user-input telephone numbers correspond to the PTT terminals 30 or the non-PTT terminals 60 (e.g., by comparing the transmitted telephone numbers with stored registered telephone numbers).

For telephone numbers corresponding to the PTT terminals 30, the PTT server 20 transmits the PTT voice data to the PTT terminals 30 (this step is not shown in FIG. 3). For telephone numbers corresponding to the non-PTT terminals 60, the PTT server 20 converts the PTT voice data into VMS formatted voice data, and transmits the telephone numbers of the non-PTT terminals 60 and the VMS formatted voice data to the VMS server 50 (S106 and S108).

Then, the VMS server 50 stores the VMS formatted voice data, and transmits a PTT short message to the appropriate non-PTT terminals 60 to notify the terminals about the received voice data from the PTT terminal 10 (S110 and S112). The non-PTT terminals 60 confirm receiving the short message and prompt the users of the non-PTT terminals 60 asking them if they want to listen to the received voice data (S114). When the user(s) indicate they want to listen to the voice data, the corresponding non-PTT terminals 60 access the VMS server 50 indicating the voice data wants to be heard, and then the VMS server 50 transmits the VMS formatted data to the corresponding terminals 60 (S116 and S118). Thus, the user of the PTT terminal 10 is able to communicate with users of non-PTT terminals 60 and the PTT terminals 30.

After listening to the voice data, the users of the non-PTT terminals 60 may respond to the user of the PTT terminal 10 (S120). In this instance, the VMS voice data from the users of the non-PTT terminals 60 is transmitted to the VMS server 50, which converts the VMS voice data into PTT formatted voice data (S122 and S124). The VMS server 50 then transmits the telephone number of the PTT terminal 10 and the PTT formatted voice data to the PTT server 20 (S126). The PTT server 20 then transmits the PTT formatted voice data to the PTT terminal 10 (S126). The user of the PTT terminal 10 may then listen to the received voice data (S130).

Figure 4A:
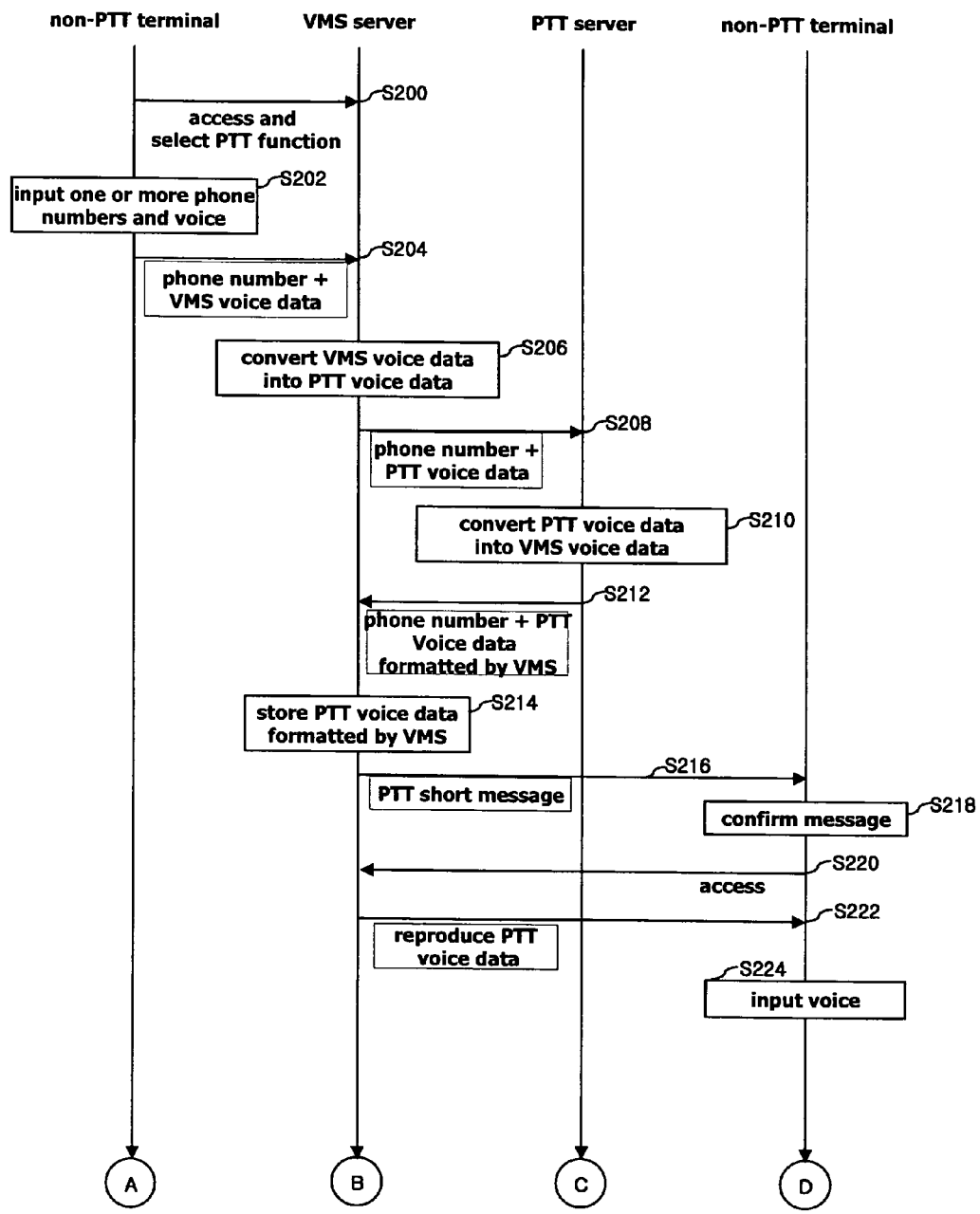
FIGS. 4a and 4b are flowcharts illustrating a PTT service mobile communication method according to a second embodiment of the present invention.
Figure 4B:
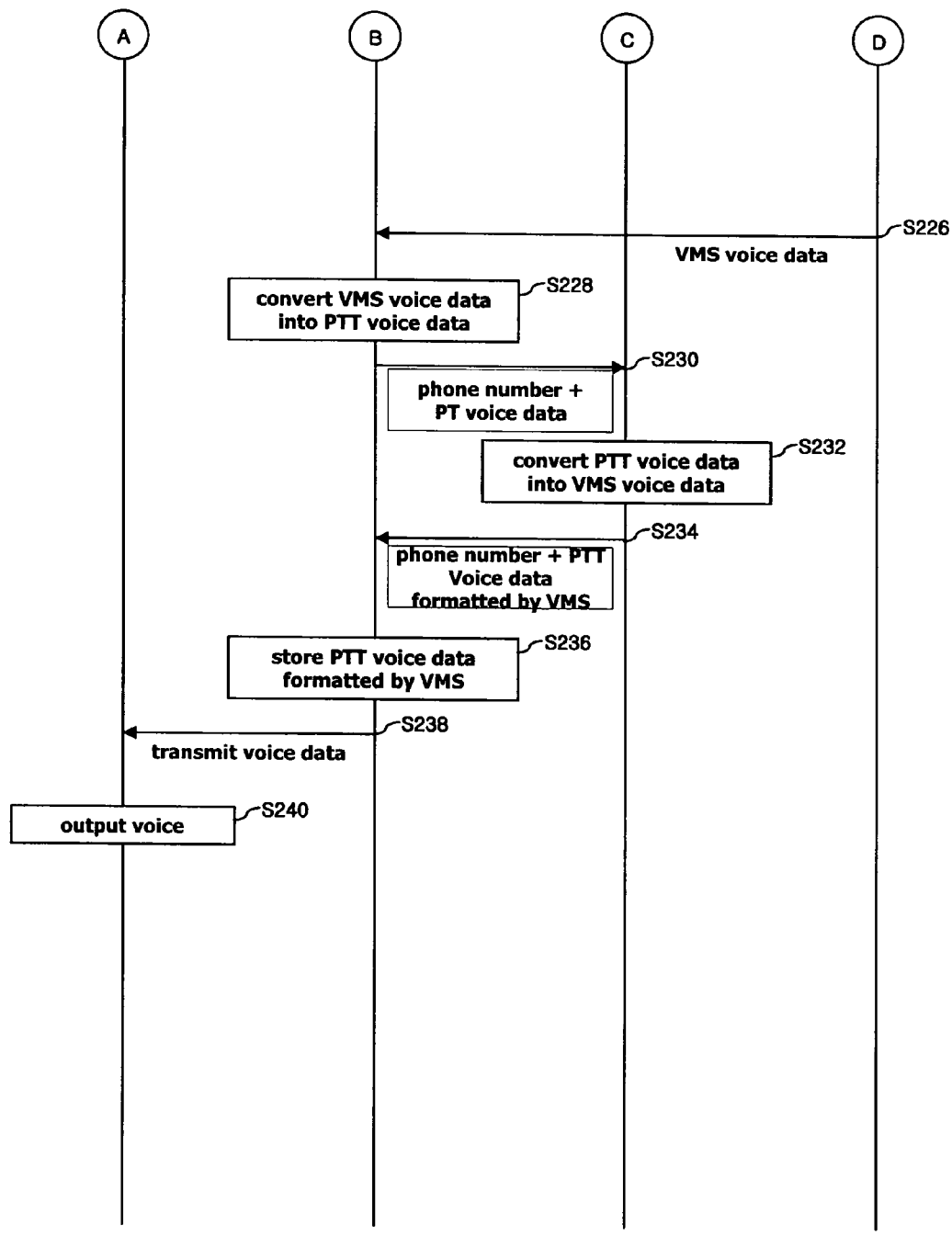

Turning next to FIGS. 4a and 4b, which are flowcharts illustrating the PTT method according to the second embodiment of the present invention. As discussed above, the second embodiment is directed to allowing the non-PTT terminal 40 to communicate with the PTT terminals 30 and non-PTT terminals 60.

As shown in FIG. 4a, when the user of the non-PTT terminal 40 wants to communicate with the PTT terminals 30 and non-PTT terminals 60, the user accesses the VMS server 50 to select a PTT function (S200). After selecting the PTT function, the user inputs one or more telephone numbers and begins speaking into the terminal (S202). The input telephone numbers and VMS voice data are then transmitted to the VMS server 50 (S204). The VMS server 50 converts the received VMS voice data into PTT formatted voice data (S206), and transmits the PTT formatted voice data and the input telephone numbers to the PTT server 20 (S208).

The PTT server 20 then confirms whether the telephone numbers received from the VMS server 50 correspond to telephone numbers of the non-PTT terminals 60 or the PTT terminals 30. For telephone numbers corresponding to the PTT terminals 30, the PTT server 20 transmits the PTT formatted voice data converted by the VMS server 50 to the appropriate PTT terminals 30. However, for telephone numbers corresponding to the non-PTT terminals 60, the PTT server 20 converts the PTT formatted voice data into VMS formatted voice data (S210), and transmits the telephone numbers and the VMS formatted voice data to the VMS server 50 (S212). The VMS server 50 then stores the VMS formatted voice data (S214), and transmits a PTT short message to notify the corresponding non-PTT terminals 60 that data has been received (S216). When the users of the non-PTT terminals 60 want to listen to the voice data, they access the VMS server 50, which then transmits the stored VMS formatted voice data to the appropriate terminals 60 (S218 and S220). The non-PTT terminals 60 then reproduce the voice data via a speaker, for example (S222).

If a user of the non-PTT terminals 60 wants to respond to the call from the non-PTT terminal 40, he or she begins speaking into the terminal (S224). As shown in FIG. 4b, the inputted VMS voice data is transmitted to the VMS server 50 (S226). The VMS server 50 then converts the VMS voice data into PTT voice data (S228), and transmits the telephone number of the non-PTT terminal 40 and the PTT formatted voice data to the PTT server 20, which then converts the received PTT formatted voice data into VMS formatted voice data (S230 and S232). Thereafter, the PTT server 20 transmits the telephone number and the VMS formatted voice data to the VMS server 50, which then stores the VMS formatted voice data (S234 and S236). The VMS server 50 then transmits the VMS voice data to the non-PTT terminal 40, and the terminal 40 receiving the VMS voice data outputs the received voice data in a speaker, for example (S238 and S240).

The second embodiment described above with reference to FIGS. 4a and 4b illustrates the VMS server 50 converting VMS voice data into PTT formatted voice data and transmitting the PTT formatted data to the PTT server 20. The PTT server 20 then determines if the telephone numbers input at the non-PTT terminal 40 correspond to PTT terminals 30 or non-PTT terminals 60.

For telephone numbers corresponding to non-PTT terminals 60, the PTT server converts the PTT formatted voice data into VMS formatted data, and transmits the VMS formatted data to the VMS server 50. For telephone numbers corresponding to the PTT terminals 30, the PTT server transmits the PTT formatted voice data (received from the VMS server) to the PTT terminals 30.

However, in an alternative embodiment, the VMS server 50 may be configured to determine if the telephone numbers input at the non-PTT terminal 40 correspond to PTT terminals 30 or non-PTT terminals 60. In this alternative embodiment, for telephone numbers corresponding to non-PTT terminals 60, the VMS server may be configured to transmit the VMS voice data from the non-PTT terminal 40 directly to the non-PTT terminals 60 (rather than converting and transmitting the voice data to the PTT server).

Further, for telephone numbers corresponding to the PTT terminals 30, the VMS server 50 may be configured to convert the VMS voice data into PTT formatted voice data, and transmit the converted voice data and appropriate telephone numbers to the PTT server 20. The PTT server 20 then transmits the converted voice data to the appropriate PTT terminals 10, 30.

Thus, according to the present invention, a PTT function can be used between a PTT terminal and a non-PTT terminal by interworking a PTT server and a VMS server.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication system, comprising:
   a sender terminal configured to input PTT (Push to Talk) voice data;
   a PTT server configured to receive the PTT voice data from the sender terminal and to convert the PTT voice data into VMS (Voice Mail System) formatted voice data; and
   a VMS server configured to receive the VMS formatted voice data from the PTT server and to transmit the VMS formatted voice data to non-PTT receiver terminals that do not support a PTT function and are not subscribed to a PTT service the sender terminal is subscribed to,
   wherein the PTT server is further configured to compare first numbers input at the sender terminal with second numbers of PTT receiver terminals existing in a PTT service area, and
   wherein for the first numbers that are different from the second numbers, which indicates the first numbers correspond to non-PTT terminals, the PTT server transmits the VMS formatted voice data and the first numbers that are different from the second numbers to the VMS server, and the VMS server transmits the VMS formatted voice data to the non-PTT terminals that correspond to the first numbers that are different from the second numbers.

2. The system of claim 1, wherein the PTT server comprises:
a first module configured to convert the PTT voice data into the VMS formatted voice data; and
a second module configured to transmit the VMS formatted voice data to the VMS server.

3. The system of claim 1, wherein for the first numbers that are the same as the second numbers, which indicates the first numbers correspond to PTT terminals, the PTT server transmits the PTT voice data input at the sender terminal without converting the data into the VMS formatted data to respective PTT terminals existing in the PTT server area that correspond to the first numbers that are the same as the second numbers.

4. The system of claim 1, wherein the VMS server comprises:
a first module configured to receive the VMS formatted voice data from the PTT server; and
a second module configured to transmit the received VMS formatted voice data to the non-PTT receiver terminals.

5. The system of claim 4, wherein the VMS server further comprises:
a third module configured to transmit a short message to the receiver terminals to notify the receiver terminals that the VMS formatted voice data has been received.

6. A mobile communication system, comprising:
a voice mail system (VMS) server configured to convert VMS voice data from a sender terminal into Push To Talk (PTT) formatted voice data;
a PTT server configured to receive the PTT formatted voice data from the VMS server, to convert the PTT voice data into VMS formatted voice data, and to transmit the VMS formatted voice data to the VMS server; and
non-PTT receiver terminals configured to receive and reproduce the VMS formatted voice data transmitted from the PTT server, said non-PTT receiver terminals not supporting a PTT function and are not subscribed to a PTT service the sender terminal is subscribed to,
wherein the PTT server is further configured to compare first numbers input at the sender terminal with second numbers of PTT receiver terminals existing in a PTT service area, and
wherein for the first numbers that are different from the second numbers, which indicates the first numbers correspond to non-PTT terminals, the PTT server transmits the VMS formatted voice data and the first numbers that are different from the second numbers to the VMS server, and the VMS server transmits the VMS formatted voice data to the non-PTT terminals that correspond to the first numbers that are different from the second numbers.

7. The system of claim 6, wherein the PTT server comprises:
a first module configured to receive the PTT formatted voice data;
a second module configured to convert the received PTT formatted voice data into VMS formatted voice data; and
a third module configured to transmit the VMS formatted voice data to the VMS server.

8. The system of claim 6, wherein for the first numbers that are the same as the second numbers, which indicates the first numbers correspond to PTT terminals, the PTT server transmits the PTT formatted voice data converted by the VMS server to respective PTT terminals existing in the PTT server area that correspond to the first numbers that are the same as the second numbers.

9. The system of claim 6, wherein the VMS server comprises:
a first module configured to convert the VMS voice data into the PTT formatted voice data; and
a second module configured to transmit the PTT formatted voice data to the PTT server.

10. The system of claim 9, wherein the VMS server further comprises:
a third module configured to transmit a short message to the non-PTT receiver terminals to notify the non-PTT receiver terminals that the VMS formatted voice data has been received.

11. A mobile communication method, comprising:
inputting PTT (Push to Talk) voice data at a sender terminal;
converting the PTT voice data into VMS (Voice Mail System) formatted voice data;
transmitting the VMS formatted voice data to non-PTT receiver terminals; and
comparing first numbers input at the sender terminal with second numbers of PTT receiver terminals existing in a PTT service area,
wherein for the first numbers that are different from the second numbers, which indicates the first numbers correspond to non-PTT terminals, the method further comprises:
transmitting the VMS formatted voice data and the first numbers that are different from the second numbers to a VMS server serving non-PTT terminals that correspond to the first numbers that are different than the second numbers, and transmitting, by the VMS server, the VMS formatted voice data to the non-PTT terminals that correspond to the first numbers that are different from the second numbers.

12. The method of claim 11 wherein for the first numbers that are the same as the second numbers, which indicates the first numbers correspond to PTT terminals, the method further comprises:
transmitting the PTT voice data input at the sender terminal without converting the data into the VMS formatted data to respective PTT terminals existing in the PTT server area that correspond to the first numbers that are the same as the second numbers.

13. The method of claim 11, further comprising:
transmitting a short message to the non-PTT receiver terminals to notify the receiver terminals that the VMS formatted voice data has been received.

14. A mobile communication method, comprising:
converting VMS voice data from a sender terminal into Push To Talk (PTT) formatted voice data;
converting the PTT voice data into VMS formatted voice data, and transmitting the VMS formatted voice data to the VMS server;
transmitting the VMS formatted voice data to non-PTT terminals, and
comparing first numbers input at the sender terminal with second numbers of PTT receiver terminals existing in a PTT service area,
wherein for the first numbers that are different from the second numbers, which indicates the first numbers correspond to non-PTT terminals, the method further comprises:

transmitting the VMS formatted voice data and the first numbers that are different from the second numbers to a VMS server serving non-PTT terminals that correspond to the first numbers that are different than the second numbers, and transmitting, by the VMS server, the VMS formatted voice data to the non-PTT terminals that correspond to the first numbers that are different from the second numbers.

15. The method of claim 14, wherein for the first numbers that are the same as the second numbers, which indicates the first numbers correspond to PTT terminals, the method further comprises:

transmitting the PTT formatted voice data to respective PTT terminals existing in the PTT server area that correspond to the first numbers that are the same as the second numbers.

16. The method of claim 14, further comprising:

transmitting a short message to the non-PTT receiver terminals to notify the receiver terminals that the VMS formatted voice data has been received.

* * * * *